United States Patent
Fujii et al.

[15] 3,700,337
[45] Oct. 24, 1972

[54] STRUCTURE OF EXPOSURE MEASURING DEVICE USING TWO GALVANOMETERS

[72] Inventors: Tatsuo Fujii; Toshio Tomomitsu, both of Tokyo, Japan

[73] Assignee: Nippon Kogaku K.K., Tokyo, Japan

[22] Filed: June 12, 1970

[21] Appl. No.: 45,696

[30] Foreign Application Priority Data

June 18, 1969 Japan......................44/57010
June 18, 1969 Japan......................44/57011
June 18, 1969 Japan......................44/57012

[52] U.S. Cl..................356/227, 95/10 C, 356/218, 356/228
[51] Int. Cl..............................................G01j 1/42
[58] Field of Search.......................356/218–229; 95/10 C

[56] References Cited

UNITED STATES PATENTS

| | | |
|---|---|---|
| 1,980,217 | 11/1934 | Moreno.................356/228 X |
| 2,755,704 | 7/1956 | Gilbert..................356/228 X |
| 2,889,740 | 6/1959 | Sauer et al.............356/227 X |
| 3,147,680 | 9/1964 | Stimson.....................356/219 |
| 3,436,158 | 4/1969 | Schmitt.................356/227 X |
| 3,516,750 | 6/1970 | Schmitt.................356/227 X |
| 3,524,391 | 8/1970 | Fujii.....................356/227 X |
| 3,533,705 | 10/1970 | Fukushima............356/229 X |
| 3,564,259 | 2/1971 | Hennig et al........356/227 UX |
| 3,582,220 | 6/1971 | Nobusawa.................356/226 |

Primary Examiner—Ronald L. Wibert
Assistant Examiner—V. P. McGraw
Attorney—Harry G. Shapiro

[57] ABSTRACT

An electrical photo-exposure meter comprising at least one variable resistor operatively associated with an exposure factor whereby an accurate exposure free of any error resulting from a variation in the source voltage can always be obtained without checking the source voltage.

4 Claims, 9 Drawing Figures

Patented Oct. 24, 1972

INVENTORS
TATSUO FUJII AND
BY TOSHIO TOMOMITSU

Harry S. Shapiro
ATTORNEY

Patented Oct. 24, 1972

INVENTORS
TATSUO FUJII AND
TOSHIO TOMOMITSU

BY *Harry S. Shapiro*

ATTORNEY

STRUCTURE OF EXPOSURE MEASURING DEVICE USING TWO GALVANOMETERS

BACKGROUND OF THE INVENTION

1. Field of the Invention

This invention generally relates to a photo-exposure meter, and more particularly to an electrical photo-exposure meter which can always ensure an accurate proper exposure without being affected by a source voltage in use.

2. Description of the Prior Art

The prior art photo-exposure meter has unavoidably been affected by the variation in the source voltage. This has given rise to the need to additionally provide a checker circuit in order to check the source voltage while effecting the photometry.

SUMMARY OF THE INVENTION

The primary object of the present invention is to overcome the above-mentioned disadvantage and automatically correct the error resulting from a variation in the source voltage used with an electrical photo-exposure meter.

The above and other objects and features of the present invention will become fully apparent from the following description taken in conjunction with the accompanying drawings.

DESCRIPTION OF THE PREFERRED EMBODIMENTS

Figure 2:
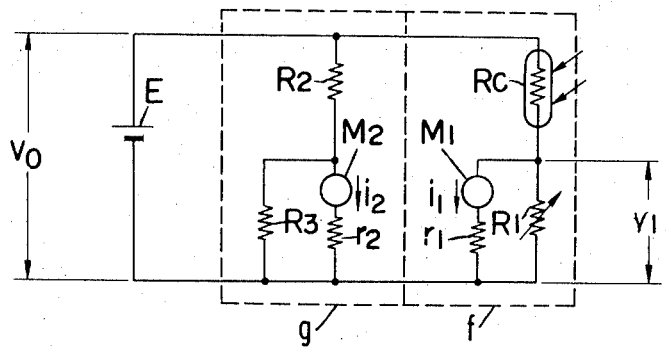
FIG. 2 shows the electrical circuit according to a first embodiment of the present invention.

Description will first be made of a first embodiment of the present invention. Referring to FIG. 2, the circuit includes galvanometers M1 and M2 and resistors R1, R2, R3, $r1$ and $r2$. The resistor R1 is a variable one operatively associated with factors such as exposure time, diaphragm aperture size and film speed.

Figure 1:
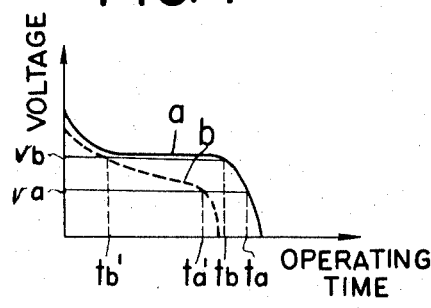
FIG. 1 is a graph illustrating the continuous discharge characteristic of the battery used with the present invention.

There is also provided in the circuit a photoconductive element RC such as a CdS cell, which forms the light receiving portion of the exposure meter. A power source E is usually provided by a mercury or silver battery and the relation between the operating time and voltage of the power source for a predetermined resistor load is such as shown in FIG. 1, where a solid curve $a$ represents the characteristic of the power source for a normal temperature and a dotted curve $b$ represents that for a lower temperature. Reference characters $i_1$ and $i_2$ represent the currents which flow through the respective galvanometers M1 and M2.

The resistance value of the variable resistor R1 and the exposure factor to be set are selected in such relationship that when the currents $i_1$ and $i_2$ assume the predetermined values $i_{10}$ and $i_{20}$ respectively for the reference source voltage Vo, by adjusting the variable resistor R1 according to the quantity of light received by the CdS cell, a proper exposure is obtained.

Figure 3:
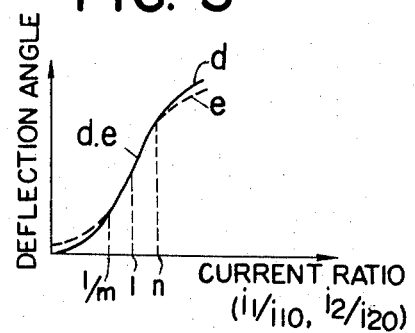
FIG. 3 is a graph illustrating the relation between the angle of deflection and the current in the galvanometer incorporated in the first embodiment.

The galvanometers M1 and M2 have respective characteristics, as shown by curves $d$ and $e$ in FIG. 3. More particularly, in the range of $n$ to $1/m$, the current ratios $1_1/i_{10}$ and $1_2/i_{20}$ are identical with each other for a deflection angle $\theta$ of the pointer of each galvanometer. As described hereinafter, the currents $i_{10}$ and $i_{20}$ flow through the galvanometer M1 and M2, respectively, when the battery E has the reference voltage $V_o$ and when the proper exposure is obtained.

Figure 4:
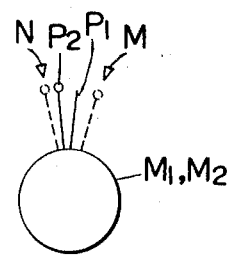
FIG. 4 is a plan view of the galvanometer.
Figure 5:
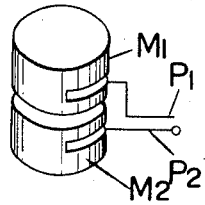
FIG. 5 is a perspective view of the galvanometer.

The galvanometers M1 and M2 are arranged coaxially with each other as shown in FIG. 5, and they have pointers P1 and P2 respectively. These galvanometers are positioned relative to each other so that their pointers P1 and P2 are registered with each other when a proper exposure is obtained at the reference source voltage $o$, that is, when the voltage across the variable resistor R1 assumes a predetermined level in which the current $i_{10}$ flows through the galvanometer M1. Therefore, when the brightness of an object to be photographed is varied and the pointer P1 is deflected as shown in FIG. 4, the variable resistor R1 is adjusted to register or align the pointer P1 with the pointer P2. Thus, the desired exposure may be obtained.

In FIG. 2, it is now assumed that a circuit including the photoconductive element Rc, galvanometer M1 and resistors R1 and $r_1$ is represented by a first circuit $f$, and that a circuit including the galvanometer M2 and the resistors R2, R3 and $r_2$ is represented by a second circuit $g$. Then, the voltage across the first circuit $f$ (i.e. the battery E) and the current $i_1$ flowing in the first galvanometer M1 are at a constant ratio as far as at least the set value of the exposure factor (i.e. variable resistor R1) and the quantity of light received by the photoconductive element remain unchanged. Also, the voltage across the second circuit g (i.e., the battery) and the current flowing in the second galvanometer M2 are at a constant ratio. When at least one of the resistors $r1, r2$, R2, R3 is operatively associated with the set exposure factor, the constant ratio is established as far as the set value of the exposure factor remains unchanged. When the quantity of light received by the photoconductive element and the set value of the exposure factor are both unchanged and the source voltage $v_o$ alone is varied, it is assumed that $i_{10}$ varies by $\Delta i_1$ to reach $i_1$ and $i_{20}$ varies by $\Delta i_2$ to reach $i_2$.

Then, the two galvanometers M1 and M2 having such characteristics as shown in FIG. 3 present a current ratio $i_1/i_{10} = i_2/i_{20}$ for the same deflection angle $\theta$ as far as their characteristics are in accord with each other. If the pointers of the respective galvanometers vary their deflection angles by $\Delta \theta_1$ and $\Delta \theta_2$, then there is given a relation that $\Delta\theta_1 = \Delta\theta_2$. Also, as far as the characteristics of the galvanometers are in accord with each other, if the value of the variable resistor R1 is varied so that the pointer P1 is registered with the pointer P2, that is, if the set value of the exposure factor is vaired, there will result a proper exposure independently of the variation in the source voltage. As a result, the operational accuracy of the photo-exposure meter is never affected by the variation of the source voltage. The current $i_2$ which flows through the galvanometer M1 when the current ratio $i_2/i_{20}$ is $1/m$ (FIG. 3), equals $i_{20}/m$ (that is, $i_2=1_{20}/m$), and the current $i_2$, when the current ratio $1_2/i_{20}$ is $n$, equals $ni_{20}$ (that is, $i_2=ni_{20}$). In this respect, indicia M and N are at the positions where the pointers $P_2$ are located at the time when the currents $i_2$ through the galvanometer M2 are $i_{20}/m$ ($i_2=i_{20}/m$) and $ni_0$ ($i_2=ni_{20}$), respectively (FIG. 4), whereby the range defined by these indicia corresponds to the range $i_{20}/m \leq i_2 \leq ni_{20}$. Thus, as far as the two pointers P1 and P2 are registered with each other within that range, any variation in the source voltage $v_0$ would does not affect the operational accuracy of the photo-exposure meter. Even if the pointers P1 and P2 are aligned with each other outside the range defined by the indices M and N, that is, in the range of $i_2/i_{20} < 1/m$ or $i_2/i_{20} > n$, curves $d$ and $e$ do not coincide, as shown in FIG. 3, so that a proper exposure setting cannot be obtained. When the pointers are registered with each other at the point M the source voltage $v_0$ corresponds to the level $v_a$ shown in FIG. 1, from which it is seen that $v_a$ is considerably lower than the check voltage $v_b$ provided by the conventional checker circuit. This in turn leads to an advantage that the life of the device is increased from $tb$ to $ta$ for a normal temperature and especially widely increased from $tb'$ to $ta'$ for a colder temperature.

In the illustrated first embodiment of the present invention, the exposure factor and the variable resistor R1 are operatively associated with each other whereas it is also possible that one or more of the resistors $r1$, $r2$, R2 and R3 may be variable resistors which may be associated with the exposure factor.

Also, the resistor R3 may be omitted, and if the other resistors are of variable type and associated with the exposure factor as mentioned above, the resistor R1 may also be omitted.

Figure 6:
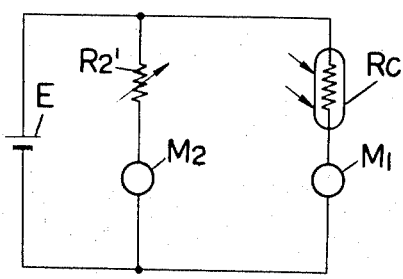
FIG. 6 shows the electrical circuit according to a second embodiment of the present invention.

For example, and arrangement using resistor R2 which is a variable resistor associated with the exposure factor and in which R1=R3=∞ is shown in a second embodiment of FIG. 6. In this case, the point at which the pointers of the two galvanometers are registered with each other is shifted not only by the variation in the source voltage but also by the set value of the proper exposure factor or the quantity of light received by the photoconductive element.

Consequently, no fixed indicia such as M and N can be employed with this embodiment, and it is necessary that the overlapping range of the characteristics in FIG. 3 be as great as possible. In other words, it is critical to provide as great a range as possible over which the relation between $\theta$ and $i_1/i_{10}$ and the relation between $\theta$ and $i_2/i_{20}$ are in interrelated with each other.

Figure 7:
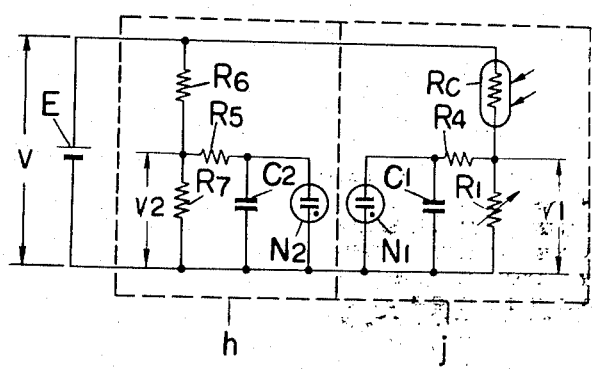
FIG. 7 shows the electrical circuit according to a third embodiment of the present invention.

A third embodiment of the present invention will now be described. Referring to FIG. 7, neon tubes N1 and N2 are included in the circuit. The neon tube N1 together with a capacitor C1 and a fixed resistor R4 constitutes an oscillation circuit and its flash cycle is governed by a voltage $v_1$. Similarly, the other neon tube N2 together with a capacitor C2 and a fixed resistor R5 constitutes an oscillation circuit and its flash cycle is governed by a voltage $v_2$. This voltage $v_2$ has a value obtained by dividing the source voltage $v$ by resistors R6 and R7, whose resistance values may be R6=0 and R7=∞, respectively. A variable resistor R1 is operatively associated with the set value of the exposure factor.

There is also provided a photoconductive element Rc such as a CdS cell which forms the light receiving portion of the photo-exposure meter.

A power source E such as a battery has a performance as shown in FIG. 1. The value of the variable resistor R1 and the exposure factor to be set are selected in such relationship that when the voltage across the variable resistor R1 operatively associated with the exposure factor for the reference source voltage $v_0$ assumes a predetermined voltage $v_1$, a proper exposure may be set up independently of the resistance value variable with the quantity of light received by the photoconductive element Rc. As a result, the flash cycle $t_1$ of the neon tube N1 to set up a proper exposure for the reference source voltage $v_0$ assumes a predetermined value $t_o$. The resistors R6, R7 and R5 and capacitor C2 are selected in accord with the characteristic of the neon tube N2 so that the flash cycle $t_2$ of the neon tube N2 may also assume the said predetermined value $t_0$ at the same time. Also, the neon tubes N1 and N2 have such characteristic that for the reference source voltage $v_0$ there is established the following relation: $v_1 : E_{11} : E_{12} = v_2 : E_{21} : E_{22}$
where $E_{11}$ and $E_{21}$ represent the voltages at which tubes N1 and N2 start to discharge, and $E_{12}$ and $E_{22}$ represent the voltages at which the neon tubes stop discharge.

In the described arrangement of FIG. 7, it is now assumed that a circuit portion $j$ including the photoconductive element Rc is a first circuit and that a circuit portion $h$ is a second circuit.

Then the voltage $v_1$ across the first circuit and the voltage $v_2$ across the second circuit assume a constant ratio independently of the source voltage when a proper condition is set up. Thus, the flash cycles of the respective neon tubes are determined as follows:

$$t_1 = C_1 R_4 \log (V_1 - E_{12})/(v_1 - E_{11})$$ and $$t_2 = C_2 R_5 \log (v_2 - E_{22})/(v_2 - E_{21})$$

When a proper exposure setting has been effected, the thus determined flash cycles become equal, i.e., $v_1/E_{11} = v_2/E_{21}$ irrespective of any variation in the source voltage. Thus, a proper exposure can be provided independently of the variation in the source voltage by adjusting the setting of the exposure factor and thereby bringing the flash cycles of the two neon into accord with each other.

A plurality of electrodes may be arranged concentrically or in two linear rows within each neon tube so that switching may be effected by flashing in in each row to thereby shift the discharge locality to the adjacent electrode so as to cause the respective rows of electrodes to correspond to the neon tubes N1 and N2 in the first and second circuits. In this case, the flash cycles of the two neon tubes can be simply brought into accord by causing the parallel moving discharge localities to move at the same velocity, and this means a great ease to check the agreement between the flash cycles of both neon tubes. According to the third embodiment, the exposure factor and the variable resistor R1 are operatively associated with each other, whereas one or both of the resistors R6 and R7 may be of the variable type and the exposure factor may be associated therewith. In this case, the variable resistor R1 may be omitted.

Figure 8:
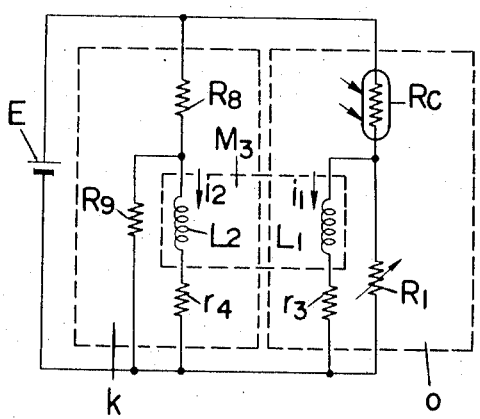
FIG. 8 shows the electrical circuit according to a fourth embodiment of the present invention.

Description will now be made of a fourth embodiment of the present invention. Referring to FIG. 8, this alternative embodiment includes coils L1 and L2 wound in superposed relationship with the coil frame of a double coil meter M3. There are also provided fixed resistors r3 and r4 including the internal resistances of the respective coils L1 and L2. R8 and R9 are fixed resistors. A variable resistor R1 is operatively associated with an exposure factor.

A photoconductive element Rc such as CdS celll constitutes the light receiving portion of the photoexposure meter. A power source E may usually be a battery such as a mercury or silver battery.

Figure 9:
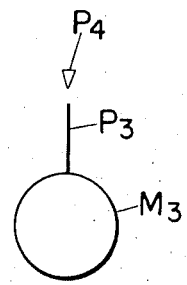
FIG. 9 is a plan view of the double-coil meter used with the fourth embodiment.

The relation between the operating time and voltage of this embodiment with respect to a predetermined resistance load is shown in FIG. 1, where the solid curve $a$ and dotted curve $b$ show the characteristics for the normal temperature and colder temperature, respectively. The number of turns of the coils is $n_1$ for coil L1 and $n_2$ for coil L2. As shown in FIG. 9, the photo-exposure meter of the present embodiment has a pointer P3 and a fixed index mark P4, which is desposed in opposed relationship with the position taken by the meter pointer P3 when the current flowing in the meter is zero. The coils L1 and L2 are turned in such directions that the directions of the current flows are opposite on the same side of the coil frame. Therefore, when the currents $i_1$ and $i_2$ flowing through the coils L1 and L2 assume $i_{10}$ and $i_{20}$ and there is established the relation that $n_1 i_{10} = n_2 i_{20}$, the pointer P3 is registered with the fixed index mark P4 to provide a proper exposure.

Also, the value of the variable resistor R1 and the exposure factor are selected in such a relation that if the currents $i_1$ and $i_2$ flowing through the coils L1 and L2 for the reference source voltage $v_0$ assume predetermined values $i_{10}$ and $i_{20}$ respectively, a proper exposure is set up independently of the value of the photoconductive element $R_c$ which is variable with the quantity of light received by the CdS cell.

In the arrangement of FIG. 8, it is assumed that a portion $o$ including the photoconductive element Rc is a first circuit and that a portion $k$ is a second circuit.

Then the voltage across the first circuit $o$, the current flowing in the first coil L1 and the voltage across the photocell are at a constant ratio as far as at least the set value of the exposure factor and the quantity of light received by the photoconductive element remain unchanged. The voltage across the second circuit $k$ and the current flowing in the second coil L2 are also at a constant ratio. (If at least one of the resistors $r3$, $r4$, R8 and R9 is operatively associated with the exposure factor as will be described, the aforementioned ratio is constant as far as the set value of the exposure factor remains unchanged.) When the quantity of light received by the photoconductive element Rc and the set value of the exposure factor are both constant and the source voltage $v_0$ alone is varied to $v$, the currents flowing in the meter coils L1 and L2 are $v/v_0$ times as great as the currents flowing in these coils for the source voltage $v_0$. As a result, the pointer P3 remains in accord with the indicium P2. In other words, any variation in the source voltage results in no variation of the value indicated by the pointer.

While the exposure factor and the variable resistor R1 are operatively associated in the fourth embodiment, one or more of the resistors $r3$, $r4$, R8 and R9 may be variable resistors with which the exposure factor may be operatively associated. The resistor R9 may be omitted, and if other resistors are variable resistors associated with the exposure factor, the variable resistor R1 may also be omitted.

From the foregoing description it will be appreciated that the present invention always ensures an accurate exposure free of any error resulting from the variation in the source voltage to be provided without checking the source voltage which would otherwise affect the photo-exposure meter.

What is claimed is:

1. An electrical photo-exposure meter comprising, in combination, a source of potential; a first circuit connected in series with the source and including a first galvanometer with a movable pointer, a variable resistor, and a photosensitive element connected in series with the first galvanometer and the variable resistor, the photosensitive element having a resistance which varies as a function of the light incident upon it, the variable resistor regulating the current flowing through the first galvanometer; a second circuit including a second galvanometer with a movable pointer and a resistor connected in series with the second galvanometer, the second circuit being connected in parallel with the first circuit, the first and second galvanometers being coaxially arranged; and two fixed indicia for cooperation with the two pointers, the two indicia being spaced from each other to define a range therebetween, whereby the proper exposure is obtainable when the two pointers overlap each other within the range between the two indicia by adjusting the variable resistor to deflect the pointer of the first galvanometer.

2. An electrical photo-exposure meter according to claim 1, wherein the first galvanometer and the variable resistor are connected in parallel with each other.

3. An electrical photo-exposure meter according to claim 2 further comprising a resistor connected in parallel with the second galvanometer.

4. An electrical photo-exposure meter comprising, in combination, a source of potential; a first circuit connected in series with the source and including a first galvanometer with a movable pointer and a photosensitive element connected in series with the first galvanometer, the photosensitive element having a resistance which varies as a function of the light incident upon it; a second circuit connected in parallel with the first circuit and including a second galvanometer with a movable pointer and a variable resistor connected in series with the galvanometer, the variable resistor regulating the current flowing through the second galvanometer, the first and second galvanometers being coaxially arranged; and two fixed indicia disposed to cooperate with the two pointers, the two indicia being spaced from each other to define a range therebetween, whereby the proper exposure is obtainable when the two pointers overlap each other within the range between the two indicia by adjusting the variable resistor to deflect the pointer of the second galvanometer.

* * * * *